US012454433B2

(12) United States Patent
Woolman et al.

(10) Patent No.: US 12,454,433 B2
(45) Date of Patent: Oct. 28, 2025

(54) TAPE DISPENSER

(71) Applicant: SHURTECH BRANDS, LLC, Avon, OH (US)

(72) Inventors: Daniel Woolman, London (GB); Stuart Woolman, Charlotte, NC (US); Heidi Carrion, Avon, OH (US)

(73) Assignee: SHURTECH BRANDS, LLC, Avon, OH (US)

( * ) Notice: Subject to any disclaimer, the term of this patent is extended or adjusted under 35 U.S.C. 154(b) by 520 days.

(21) Appl. No.: 17/787,867

(22) PCT Filed: Dec. 22, 2020

(86) PCT No.: PCT/US2020/066567
§ 371 (c)(1),
(2) Date: Jun. 21, 2022

(87) PCT Pub. No.: WO2021/133780
PCT Pub. Date: Jul. 1, 2021

(65) Prior Publication Data

US 2023/0032801 A1 Feb. 2, 2023

Related U.S. Application Data

(60) Provisional application No. 62/952,674, filed on Dec. 23, 2019.

(51) Int. Cl.

| | |
|---|---|
| ***B65H 35/00*** | (2006.01) |
| ***B25F 1/04*** | (2006.01) |
| ***B65H 23/08*** | (2006.01) |

(52) U.S. Cl.
CPC .......... *B65H 35/0033* (2013.01); *B25F 1/04* (2013.01); *B65H 23/085* (2013.01);
(Continued)

(58) Field of Classification Search
CPC ...... B65H 2701/377; B65H 2301/5154; B65H 2301/41369; B65H 23/085; B65H 35/0033; B25F 1/04
See application file for complete search history.

(56) References Cited

U.S. PATENT DOCUMENTS

2003/0116284 A1* 6/2003 Downs ................ B65H 37/005 156/579
2007/0193693 A1* 8/2007 Woodruff ........... B65H 35/0033 156/577

(Continued)

FOREIGN PATENT DOCUMENTS

JP 2009029616 A 2/2009
JP 2015214363 A 12/2015

OTHER PUBLICATIONS

Machine translation of JP 2015214363 A; Publication date: Dec. 3, 2015; Inventor: Fujita Yoshinari.*

(Continued)

*Primary Examiner* — Vishal I Patel
(74) *Attorney, Agent, or Firm* — Lippes Mathias LLP

(57) ABSTRACT

A tape dispenser having a handle, a base plate disposed at an end of the handle, a rotatable tape mount engaged on the base plate, a nose member disposed on the base plate, a cylinder rotatably engaged on the nose member near a cutter and a guide element is provided. The guide member is slidingly engaged on the base plate. The guide element is adjustable between a loading position which is slid rearwardly to provide space between a tape engaging end of the guide element and the nose member and a loaded position where the end of the guide element is located adjacent the nose member. A tape core support assembly can include a shaft secured to the frame and an axle assembly disposed about at least a portion of the shaft. The axle assembly includes a hub having an outer surface and at least three (Continued)

arcuate arms extending outwardly from the hub outer surface. An outer periphery of the arms forms a theoretical or actual cylinder configured to receive the tape core. The rotatable tape core support can include a stationary axle, a spring inclusive bushing mounted to said axle, and a rotatable tape mount. The rotatable tape mount can include a housing that receives the bushing such that the spring engages a surface of the housing to control rotation of the tape mount.

18 Claims, 11 Drawing Sheets

(52) U.S. Cl.
CPC .............. *B65H 2301/41369* (2013.01); *B65H 2301/5154* (2013.01); *B65H 2701/377* (2013.01)

(56) References Cited

U.S. PATENT DOCUMENTS

| | | | | |
|---|---|---|---|---|
| 2015/0210504 | A1* | 7/2015 | Yu Chen | B65H 75/185<br>242/600 |
| 2018/0044939 | A1* | 2/2018 | Strombeck | E05B 1/0061 |
| 2019/0009400 | A1* | 1/2019 | Nicholas | B25F 1/00 |
| 2019/0092597 | A1* | 3/2019 | Carrion | B32B 43/006 |

OTHER PUBLICATIONS

Machine translation of JP 2015214363A (Year: 2015).*

International Search Report for Application No. PCT/US2020/066567, Mailed Apr. 2, 2021, 10 pages.

* cited by examiner

TAPE DISPENSER

This application claims the benefit of U.S. Provisional Application Ser. No. 62/952,674 filed Dec. 23, 2019, which is hereby incorporated by reference.

BACKGROUND

The present disclosure generally relates to a hand-held adhesive tape dispenser. The tape dispenser is also frequently referred to as a tape gun. Conventional hand-held tape dispensers typically include a main body having a handle, a tape reel provided at a rear side of the main body, a roller provided at a front side of the main body, and a blade.

One common type of packaging is corrugated boxes. These packages are sealed prior to storage or shipment and much of the sealing is done with pressure sensitive adhesive tape, which can be cellophane backed adhesive tape. While there are various types of hand held versions of dispensers for pressure sensitive tape, current designs employ a shield (press plate) and or a cutter. This requires the user to apply a perfect balance of pressure to the press plate during tape application and toward the cutter when cutting the tape. The desired result is a clean cut in the tape at the desired length applied to the package.

To use a conventional hand-held tape dispenser, a free end of a roll of tape mounted on the tape reel is pulled to pass below the roller and attach to a surface of, for example, a packing box. By pressing and rotating the roller, a desired length of tape is firmly adhered to the packing box. Thereafter, the tape dispenser is lifted to press the blade against the tape.

Conventional hand-held tape dispensers can fail to properly manage a loose tape end. For example, after the tape is cut off, there can be counter-rotation or backlash of the reel that would pull the loose end of the tape back into contact with the reel. Another problem with conventional hand-held tape dispensers is the core size of the tape reels. Conventional handheld tape dispensers generally do not have the capacity to accept different size tape reels. Similarly, loading of the tape reel can be cumbersome. Additional problems include having the tape stick to parts of the dispenser and tape unwinding to fast or too slow because of imprecise tension. One who has experience with conventional hand-held tape dispensers will be aware of still further deficiencies and difficulties that one must confront in utilizing such devices.

In light of the foregoing, it is evident that there is a need for a hand-held adhesive tape dispenser that would provide a solution to one or more of the deficiencies from which the prior art and/or conventional hand-held tape dispensers have suffered.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a tape dispenser having a handle, a base plate disposed at an end of the handle, a rotatable tape mount engaged on the base plate, a nose member disposed on the base plate, a cylinder rotatably engaged on the nose member near a cutter and a guide element is provided. The guide member is slidingly engaged on the base plate. The guide element is adjustable between a loading position which is slid forward to provide space between a tape engaging end of the guide element and the nose member and a loaded position where the end of the guide element is located adjacent the nose member.

According to a second embodiment, an adhesive tape dispenser is provided. The dispenser is adapted to dispense tape wound upon a tape core. The dispenser includes a frame; an application roller; a cutter assembly mounted on the frame; a handle mounted on the frame; and a core support assembly secured to the frame. The core support assembly includes a shaft secured to the frame, and an axle assembly disposed about at least a portion of the shaft. The axle assembly includes a hub having an outer surface, and at least three arcuate arms extending outwardly from the hub outer surface. An outer periphery of the arms forms a theoretical or actual cylinder configured to receive the tape core.

According to a further embodiment, a tape dispenser having a handle, a base plate disposed at an end of said handle, a rotatable tape mount system engaging on said base plate, a nose member disposed on said base plate, and a cylinder rotatably engaged on said nose member near a cutter which is fixed on said nose member is provided. The rotatable tape mount system includes a stationary axle, a spring inclusive bushing mounted to said axle, and a rotatable tape mount. The rotatable tape mount includes a housing that receives the bushing such that the spring engages a surface of the housing to control rotation of the tape mount.

According to another embodiment, a tape dispenser is provided. The dispenser includes a handle, a base plate disposed at an end of the handle, a rotatable tape mount engaged on the base plate, a nose member disposed on the base plate, and a cylinder rotatably engaged on the nose member near a cutter. A retractable element is disposed on the handle. The retractable element is selected from a clip, a cutter and a lanyard.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
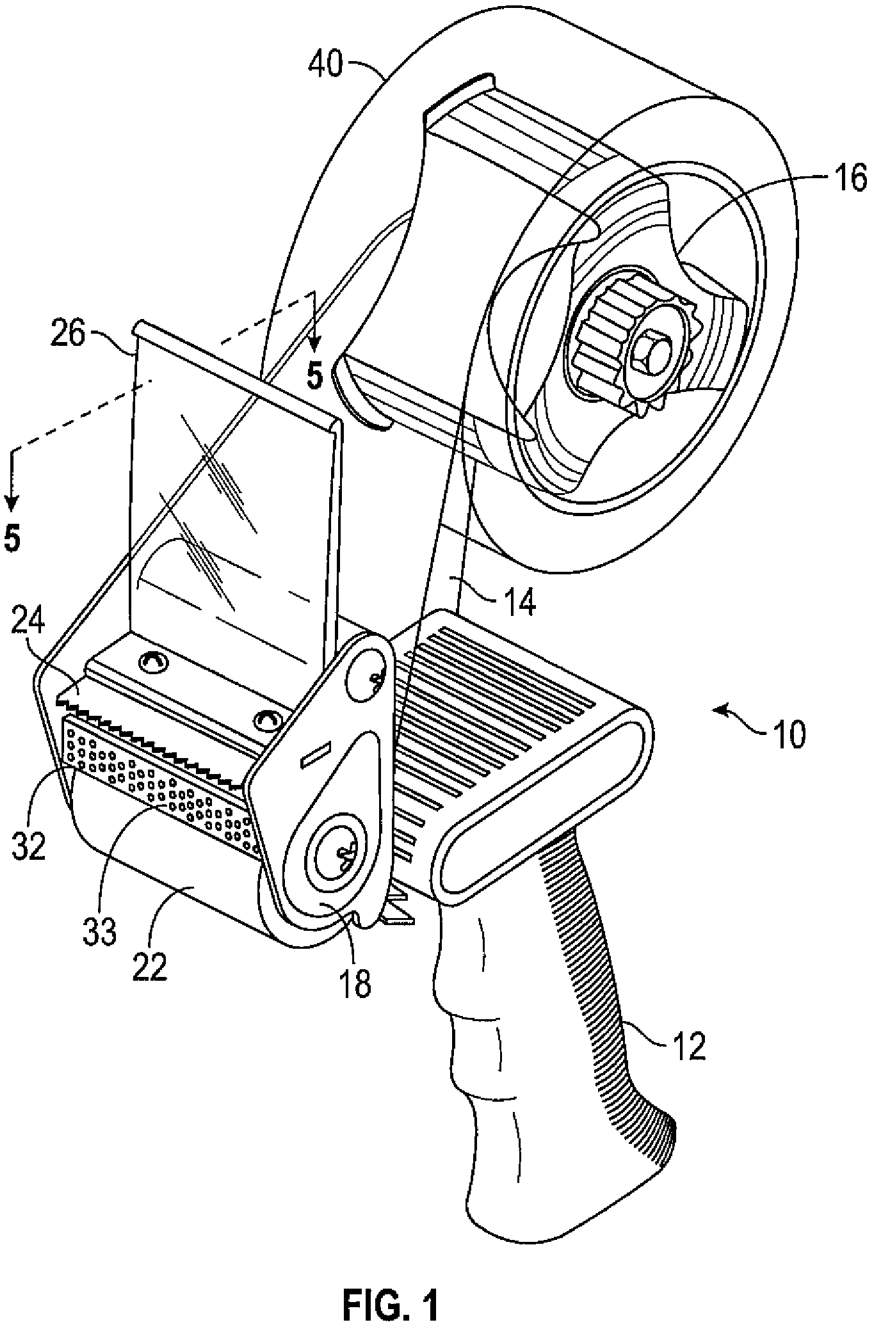
FIG. 1 PRIOR ART
FIG. 1 displays a prior art tape dispenser configuration.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

FIG. 1 is taken from U.S. Pat. No. 6,641,081, the disclosure of which is herein incorporated by reference. FIG. 1 shows a tape dispenser 10, which comprises a handle 12, a base plate 14 secured at the topside of the handle 12, a tape mount 16 pivoted at the back side of the base plate 14 and a seat member 18 secured at front side of the base plate 14. The seat member 18 pivots a cylinder 22 at front side thereof and secures a cutter 24 above the cylinder 22. In operating, the user operates the tape dispenser 10 to make the tape 40 seal a box and drives the cutter 24 to cut the tape 40, the tail of the tape 40.

Figure 2:
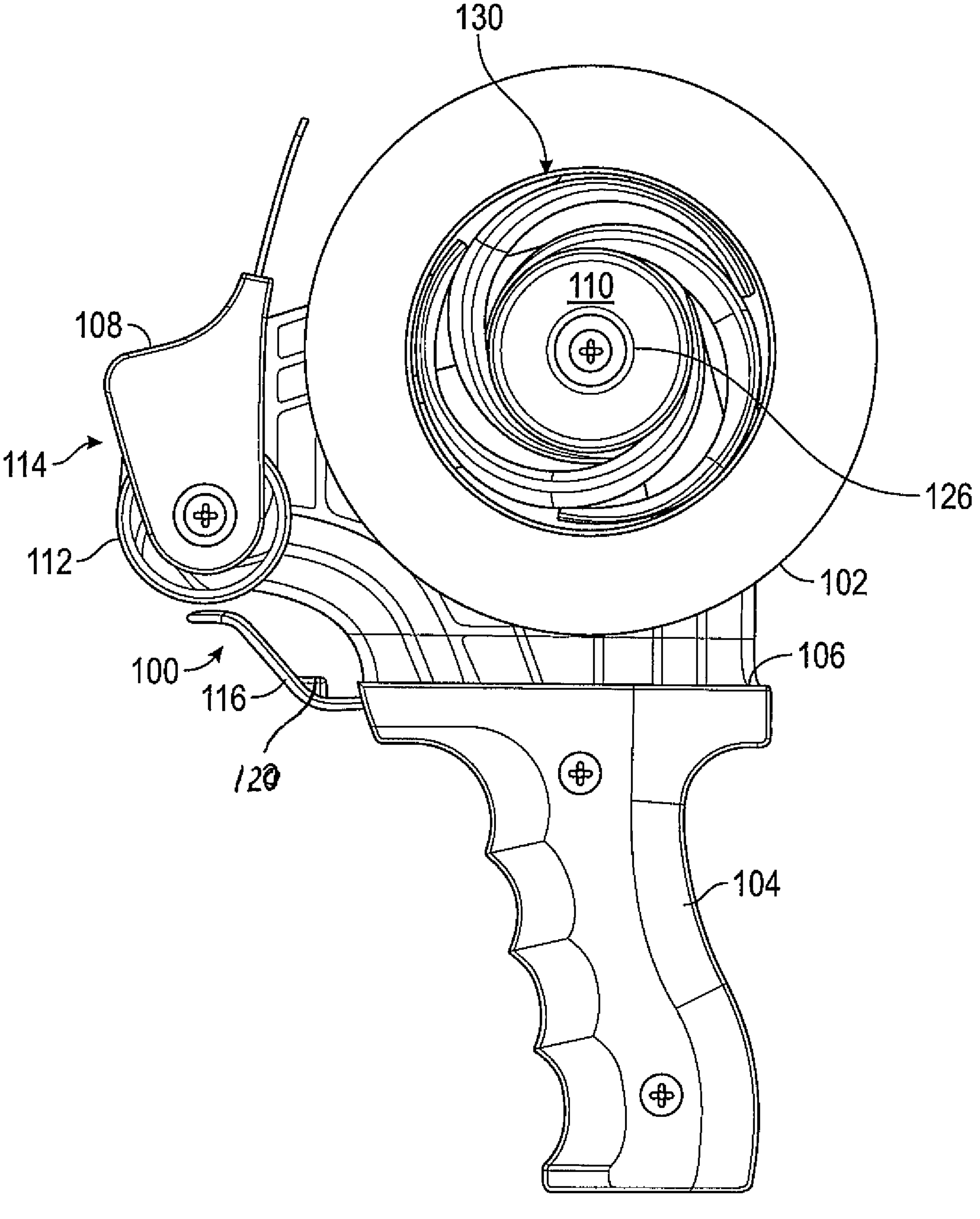
FIG. 2 is a side plan view of an adhesive tape dispenser according to the present disclosure.

Referring now to FIG. 2, the tape dispenser of the present disclosure is illustrated. The tape dispenser includes a handle 104, a base plate 106 disposed at an end of the handle, a rotatable tape mount 110 engaged with the base plate, a nose member 108 disposed on the base plate, and a cylinder 112 rotatably engaged on the nose member near a cutter 114. A guide element 116 is slidingly engaged on the base plate.

Figure 3B:
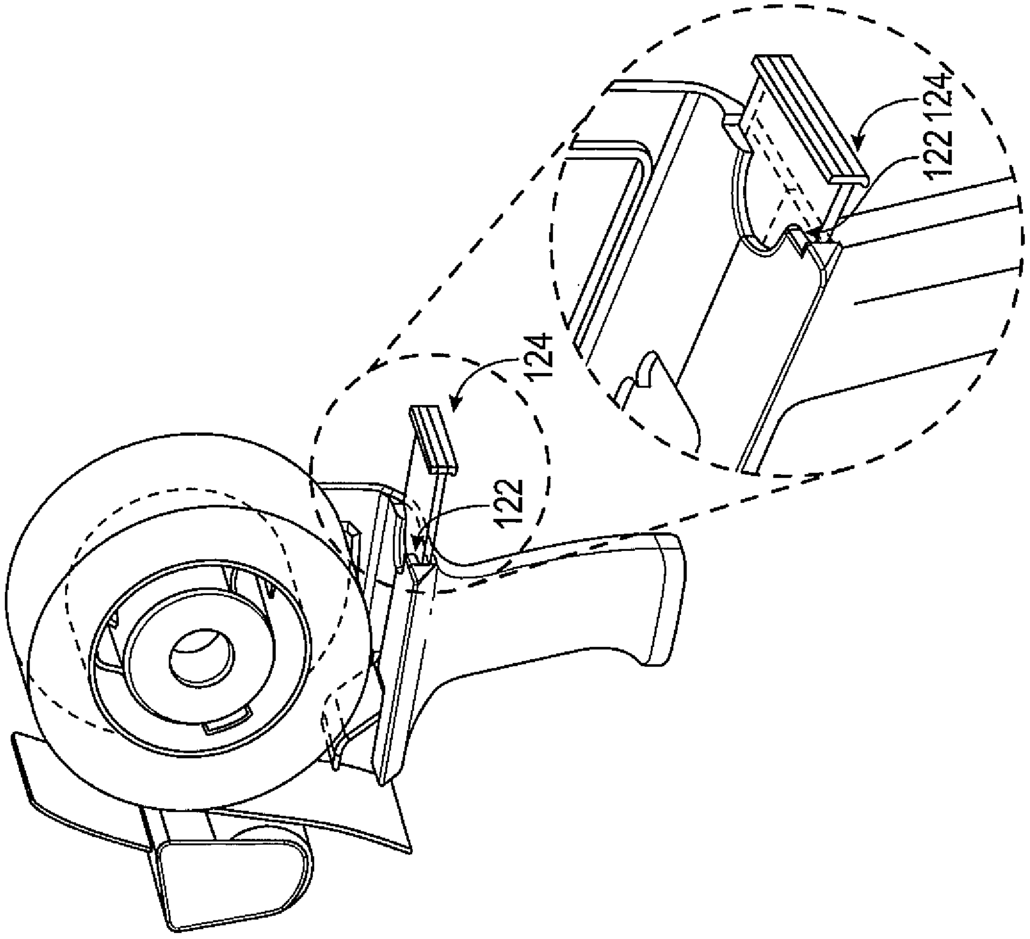
FIGS. 3A and 3B display a tape dispenser according to the present disclosure demonstrating operation of the guide element.
Figure 3A:
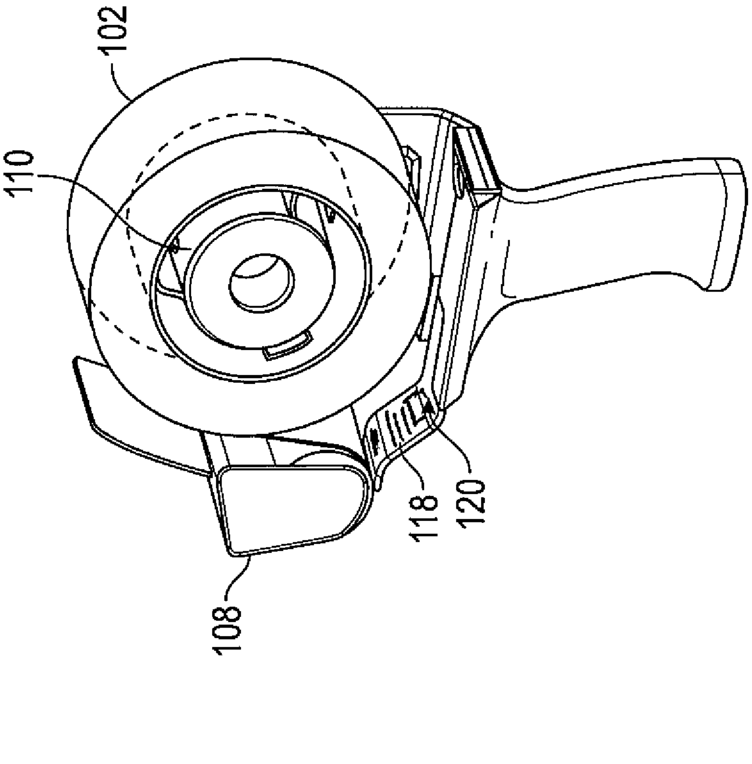

With further reference to FIGS. 3A and 3B, it is shown that the guide element is adjustable between a loading position (open) when it is slid rearwardly to provide space between a tape engaging end of the guide element and the nose member and a loaded position (closed) where guide element is slid forward such that the end of the guide element is located adjacent the nose member to support the tape. The base plate can be comprised of at least two distinct sides which in combination define a slide channel 122.

The guide element can include a plurality of ribs 118 extending perpendicular to a length of the guide element. The guide element can also include a more prominent projection 120. The ribs and projection help prevent the tape from adhering to the guide element. The guide element can be comprised of a non-stick material such as polytetrafluoroethylene. The guide element can include a grip portion, for example a thumb scoop 124, at an end opposite the tape engaging end.

Figure 4A:
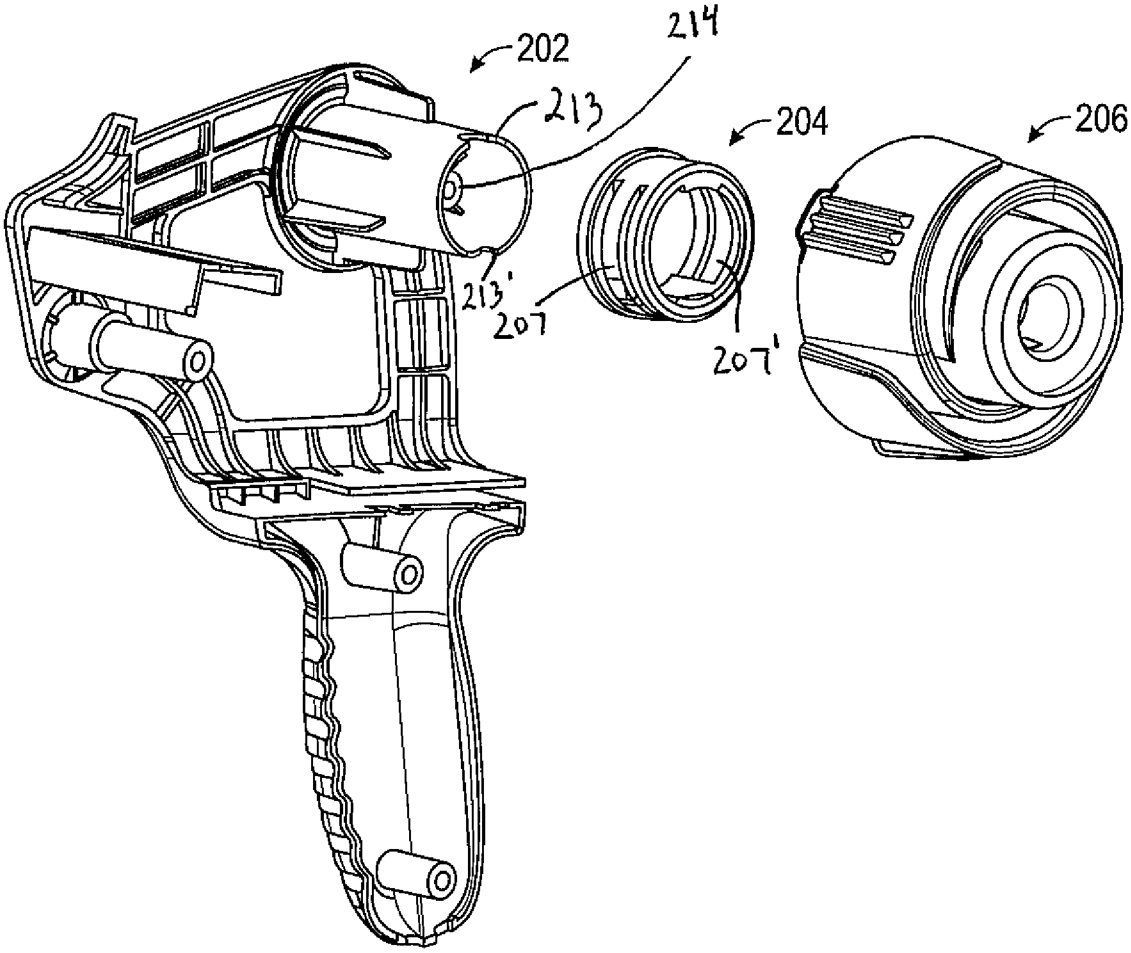
FIGS. 4A and 4B illustrate front and back side perspective exploded views of a tape roll mounting assembly according to the present disclosure.
Figure 4B:
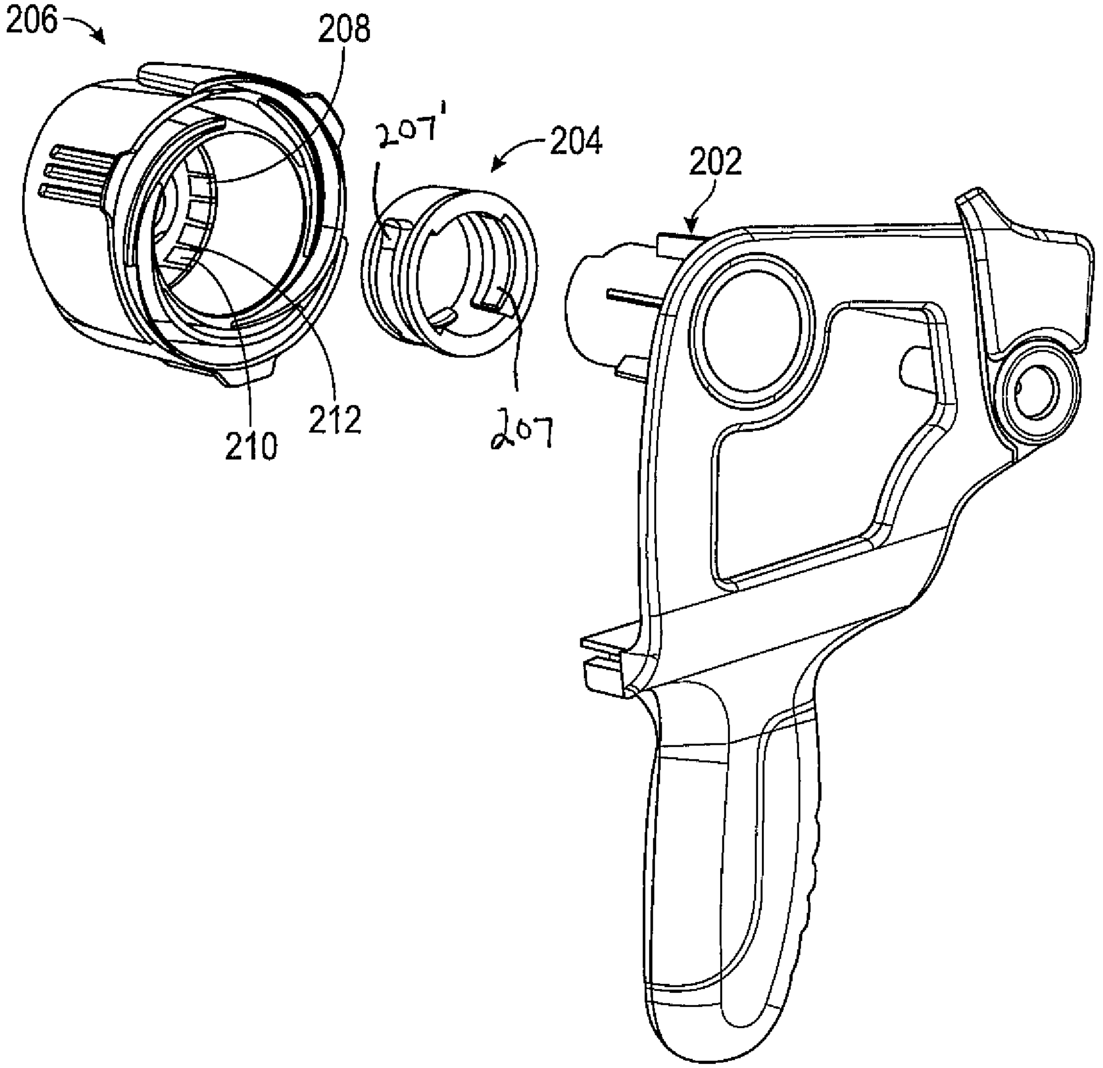

Referring now to FIGS. 4A and 4B, components of the tape mount system are illustrated. The rotatable tape mount system includes a stationary axle 202, a spring inclusive bushing 204 mounted to the axle, and a rotatable tape mount 206. The rotatable tape mount defines a housing that receives the bushing. The bushing springs 207/207' engage a surface of the housing to control rotation of the tape mount. The interior surface of the housing can include a plurality of ratchet teeth 208 that receive the spring(s). The teeth can have a shallow sloped wall 210 and a steeper sloped wall 212. The shallow wall can provide some resistance to rotation of the tape mount body and the steep wall can provide significant resistance. Accordingly, the shallow walls provide tension to achieve a controlled unwinding of the tape and the steep walls prevent rotation in the opposite direction wherein the tape would be pulled from the nose and back onto the roll.

The tension system is made up of three main parts including a) the axle; b) the bushing and c) the rotatable tape mount. The axle is fixed and part of the main chassis. The axle includes two cut-outs 213/213' in an edge to prevent the bushing from rotating. It also has a screw boss 214.

The bushing is designed to have free space for the springs to move inwards and have space to function. The bushing and tape mount are pushed onto the axle and is secured with a screw which holds the parts together.

The bushing can be molded as a separate part from a material such as an engineered thermoplastic suitable for constant bending and flexing. Exemplary materials include polyoxymethylene and polyformaldehyde. Exemplary commercialized materials include Delrin, Ultraform, Celevn, Ramtal, Dusacon, Polypinco and Hostaform. The bushing and the main body of the tape dispenser are likely formed of different materials.

Preferably, the spring is not left in a tensioned state (sprung) for long periods so that the spring leaves do not "take a set/memorize". This is achieved by having a certain amount of free rotational movement along with a shallow lead-in slope on the teeth and a small radius on the teeth tops. Moreover, the circumferential surface area of the bushing covered by teeth recesses is greater than surface area covered by teeth peaks. This reduces the chance of the springs being left in a "sprung" state (i.e., fully compressed).

The tape mount is set-up to be one-way rotation. The direction of movement allows the tape roll to only move anti-clockwise when viewed from the open side of the dispenser. This one-way ratchet has a number of functions: 1. To stop backward rotation of the tape roll (clockwise). 2. To act as a partial brake (against momentum) and to stop excessive forward (anti-clockwise) rotation. 3. To provide tension to tapes of differing length (and weight). A heavier tape has more rotating momentum than a lighter tape so needs more stopping power. As an alternative, the ratchet can be configured as two-way (so functioning both anti-clockwise and clockwise).

It can also be adjusted or tuned to have different characteristics. The ratchet can be adjusted (or tuned) to be louder/quieter, finer/coarser, more braking/less braking.

These adjustments can be achieved by adjusting depth of teeth - - - louder/quieter; number of teeth - - - finer/coarser; adjust angle of slope - - - more braking/less braking; or by adding springs (e.g. four springs) rather than the two shown in the FIGS. 4A and B.

Figure 5:
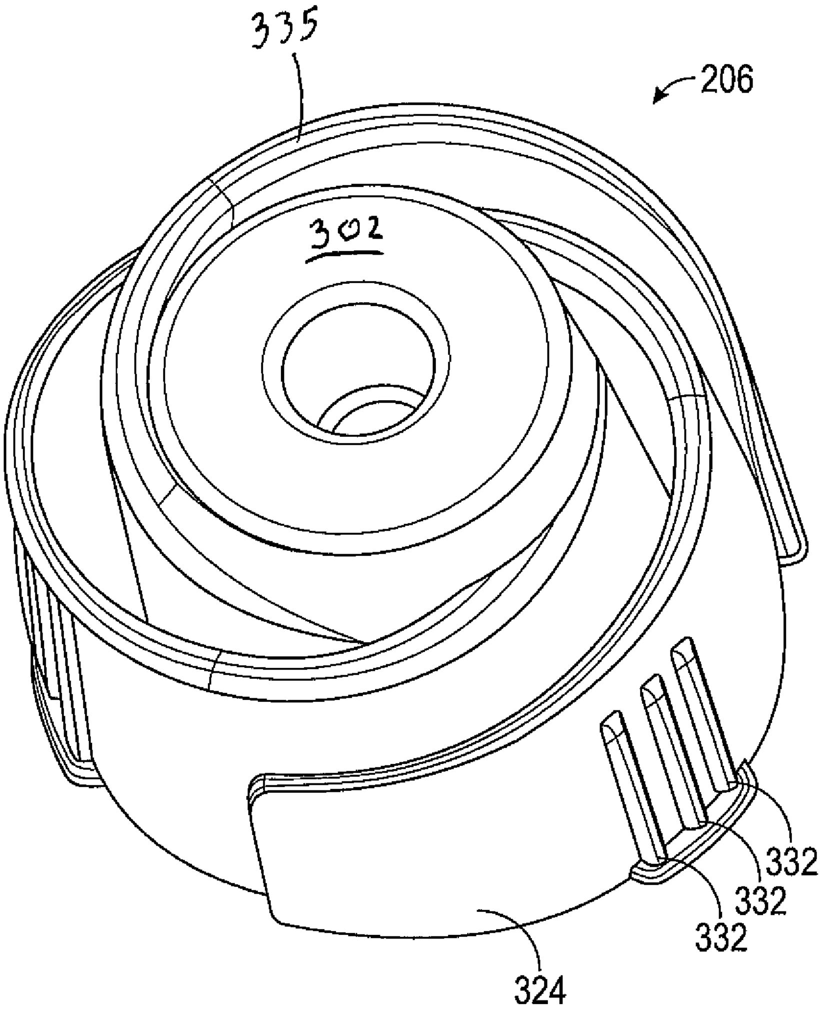
FIG. 5 is an enlarged perspective view of the tape mount body.

Referring now to FIG. 5, the tape roll tape mount 206 is illustrated. The assembly has a hub 302 with an outer surface and at least three arcuate arms 322 extending outwardly from the hub. The outer periphery of the arms forms a theoretical or actual cylinder configured to receive a tape core. The arms include a peripheral surface having a plurality of ribs (teeth) 324 at least generally perpendicular to a longitudinal axis of each arm. The arms are inwardly flexible, allowing compression thereof when a tape roll is installed. In this manner, the tape roll mount can be compressed to receive numerous diameters of tape rolls. In this context, it may be desirable in certain embodiments to provide the exterior edge 335 of the arcuate arms with a chamfer or are rounded to allow the tape roll to more easily slide onto the tape mount.

Figure 6A:
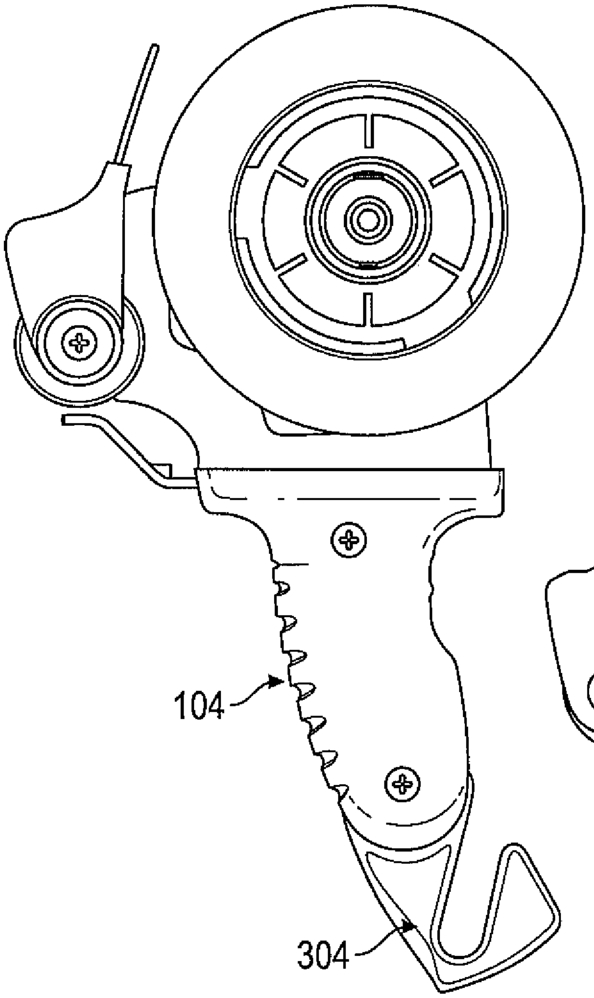
FIGS. 6A-6C are several views of an optional retractable tools.
Figure 6B:
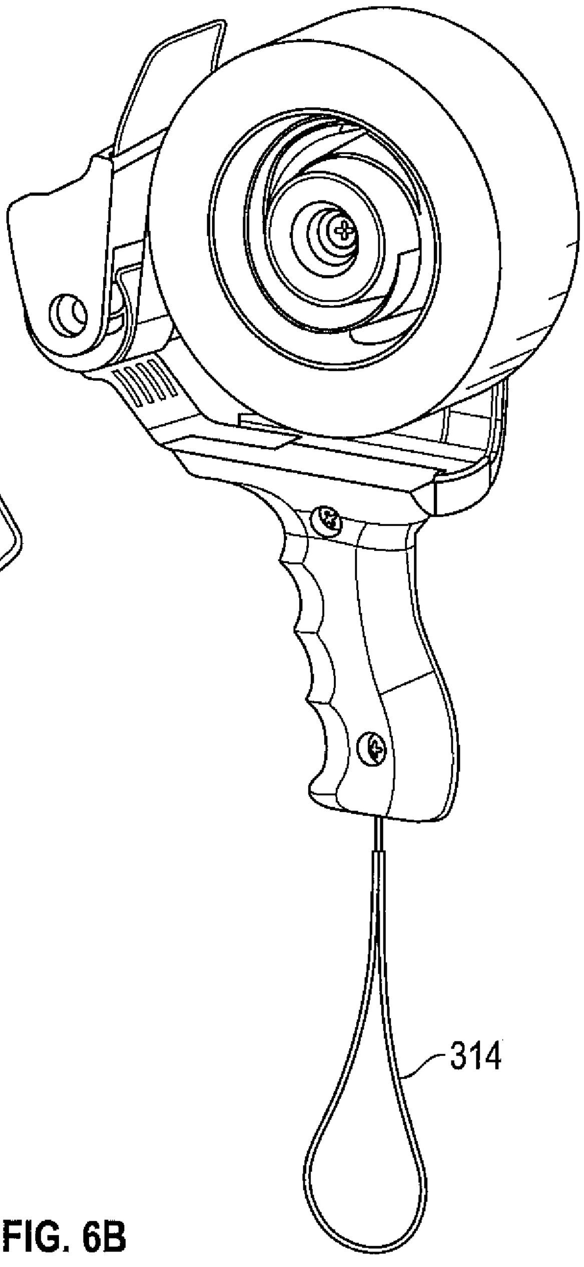
Figure 6C:
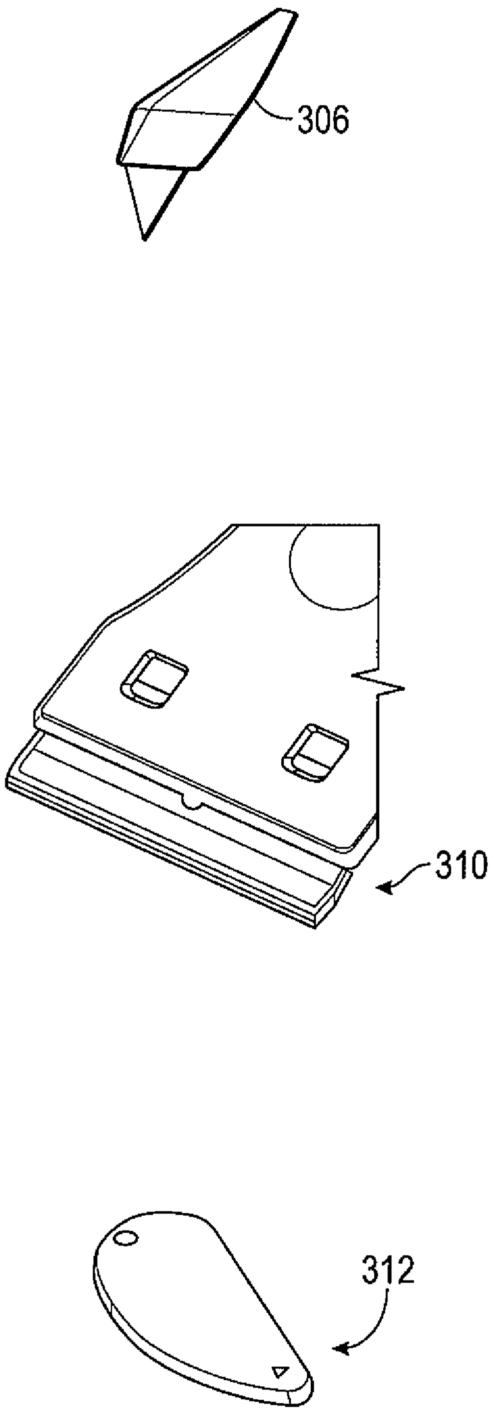

Referring now to FIGS. 6A and 6B, a tape dispenser comprising a handle 104 with a retractable element disposed thereon is illustrated. The retractable element can be a clip 304, a cutter 306, a scrapping tool 310, a nub 312 or a lanyard 314, as examples. The cutter can include a retractable blade 306. In the illustrated embodiments, the clip, the cutter (optionally with retractable blade), the scrapping tool and the ceramic nub can be rotatable between an exposed position and a position hidden within a recess in the handle. The retractable lanyard can be mounted, for example, to a ratched wheel disposed in the handle.

Figure 7:
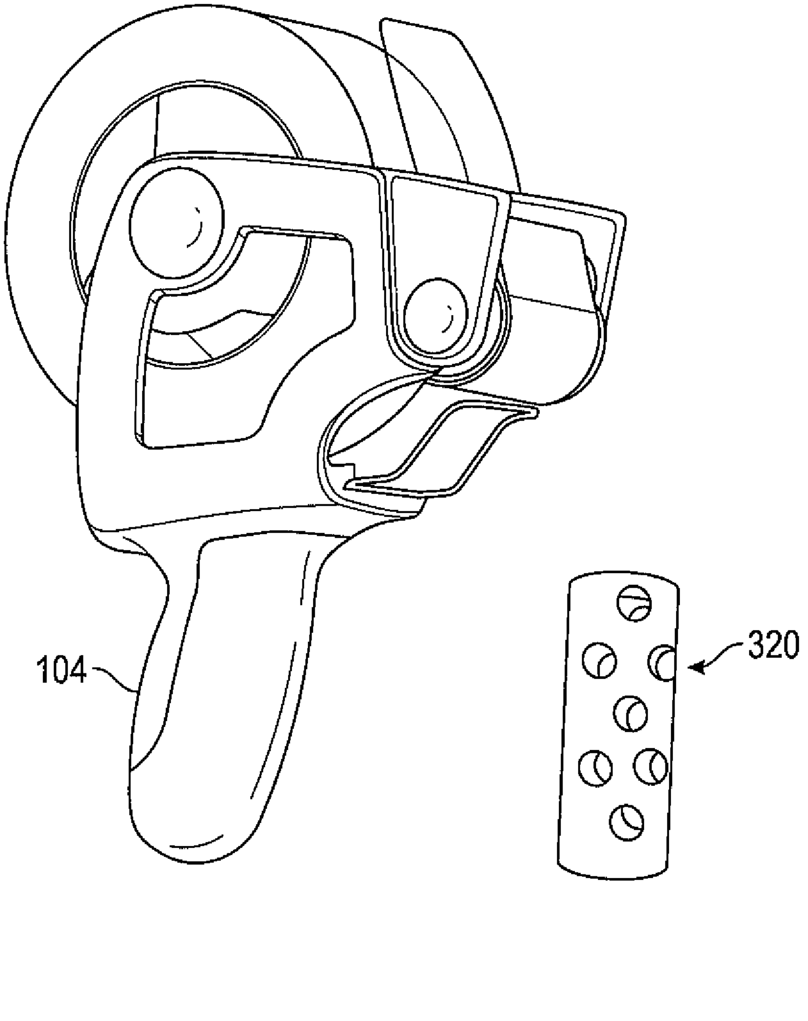
FIG. 7 is a perspective view of an antimicrobial aspect of the tape dispenser.

As shown in FIG. 7, the dispenser may be equipped with a removeable antimicrobial sleeve 320 configured to slidably engage the handle 104.

Figure 8B:
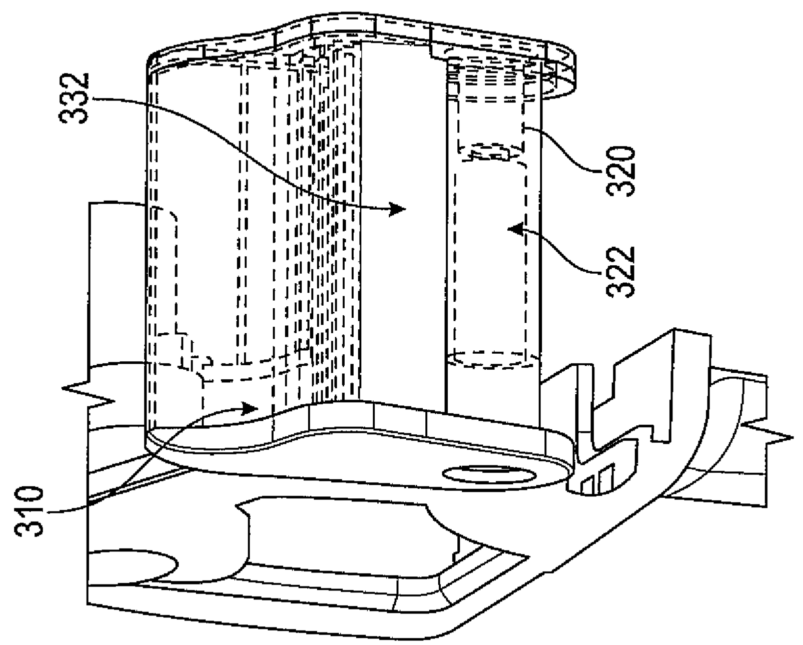
FIGS. 8A and 8B are views of the tape dispenser demonstrating the interconnection of molded elements of the dispenser during assembly.
Figure 8A:
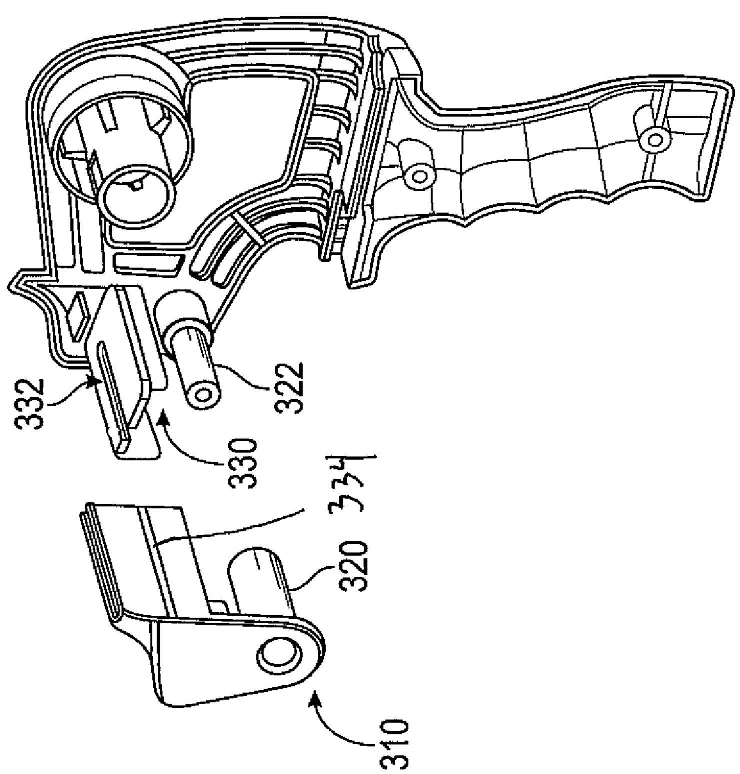

With reference to FIGS. 8A and 8B the robust construction of the tape dispenser is illustrated. Moreover, the interlocking of the components in the nose member is shown. Particularly, the blade supporting surface component 310 includes post 320 that receives a complimentary post 322 on the tape dispenser main body. Similarly, the tape dispenser main body includes a projection 330 having notch 332 that receives channels 334 (only a first side is illustrated) in component 310. In an assembled state, the tape dispensing surface and cutter assembly formed by the combination of component 310 is supported by post 322 and projection 330 to provide exceptional strength.

Figure 9:
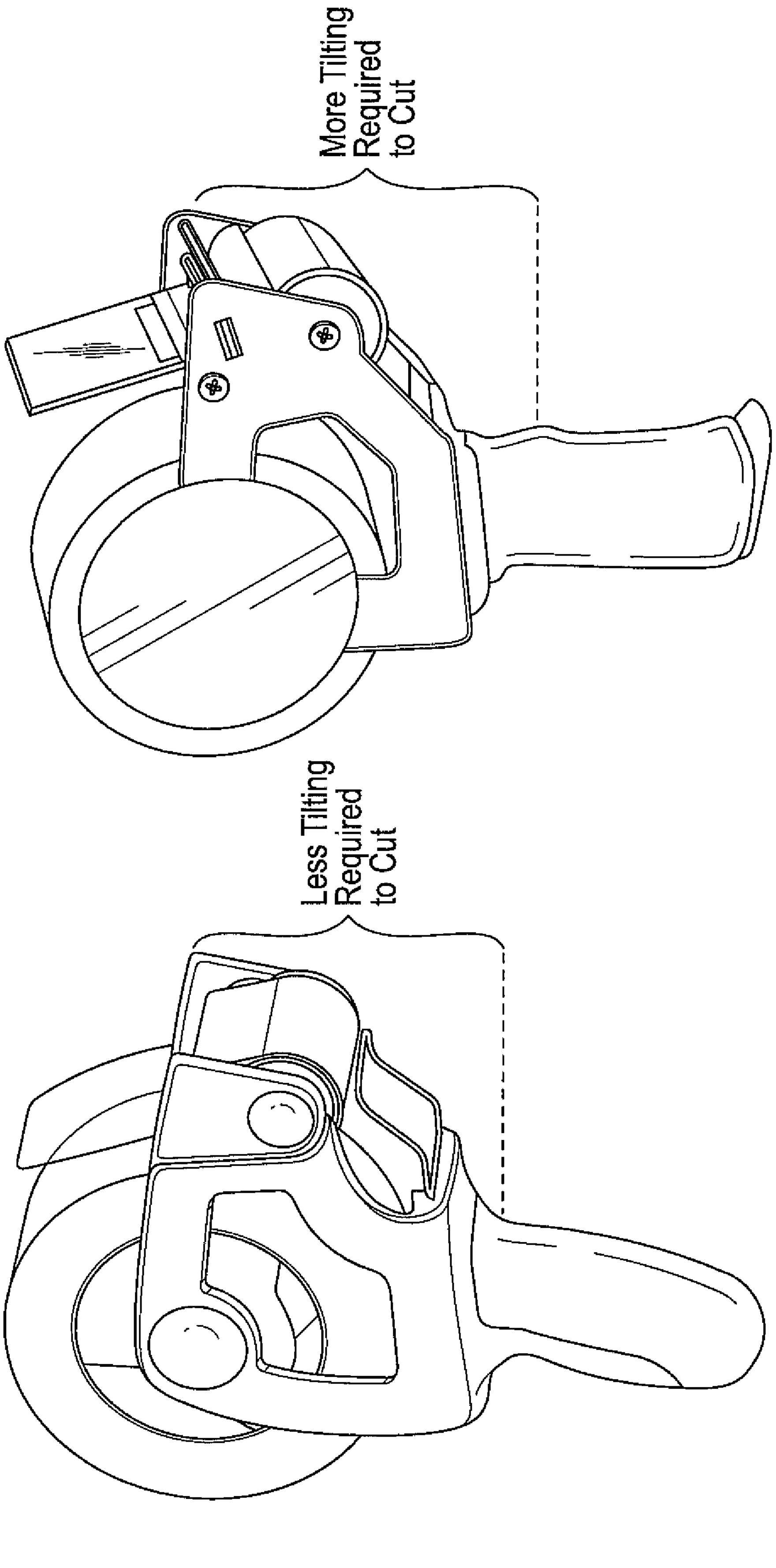
FIG. 9 is an illustration demonstrating the advantageous placement of the cutter and roller to reduce tilting requirements during a cutting step.

FIG. 9 shows aspects of the present tape dispenser designed to reduce the likelihood of the tape roll impacting the surface upon which the tape is being applied during the tape cutting step. Moreover, the dispenser is modified such that the handle extends at an obtuse angle (front side) relative to the base plate. Described in an alternative manner, if the base plate forms a tangent to the tape roll and when the base plate is generally perpendicular to the ground, the handle extends at a radius of the tape roll between greater than 180° and 210°.

Furthermore, the nose element has been lengthened to locate the cutting blade more remote from the tape roll. In addition, the nose extends from the tape roll at generally the same tangent angle as the handle relative to the circle formed by the tape roll. More specifically, using the dispenser orientation described above, the nose extends at a radius between greater than 90° and 110°.

The dispenser can be further equipped with a mechanism to fold the edges of the tape as it is dispensed. An exemplary edge folding mechanism is described in U.S. Pat. No. 10,173,858, which is herein incorporated by reference. The edge folding mechanism could be a permanently molded element of the dispenser or may be a snap-in option.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A tape dispenser comprising a handle, a base plate disposed at an end of said handle, a rotatable tape mount engaged on said base plate, a nose member disposed on said base plate, a cylinder rotatably engaged on said nose member near a cutter which is fixed on said nose member and a guide element slidingly engaged on said base plate, said guide element being adjustable between a loading position which is slid toward the base plate to provide a space between a tape engaging end of the guide element and the nose member, said space allowing an end of a tape mounted on the cylinder to hang freely between the guide element and the nose member, and a loaded position where the end of the guide element is located adjacent the nose member with the tape resting upon the guide element.

2. The tape dispenser of claim 1 where the tape engaging end of the guide element includes a plurality of rails extending perpendicular to a length of the guide element.

3. The tape dispenser of claim 1 wherein the guidance guide element is comprised of a non-stick material.

4. The tape dispenser of claim 1 wherein the base plate is comprised of at least two distinct sides which in combination define a slide channel.

5. The tape dispenser of claim 1 wherein the guide element includes a grip portion at an end opposite the tape engaging end.

6. The tape dispenser of claim 1 wherein the rotatable tape mount is configured to hold a roll of tape on the rotatable tape mount by at least three flexible retaining arms.

7. The tape dispenser of claim 1 wherein the handle includes a retractable element selected from a clip, a cutter, a scrapping tool, and a lanyard.

8. The tape dispenser of claim 7 wherein said cutter comprises a body and a retractable blade.

9. The tape dispenser of claim 1 wherein the handle is equipped with an antimicrobial sleeve configured to slideably engage the handle.

10. The tape dispenser of claim 1 wherein the base plate resides in a plane generally tangential to a circle defined by a roll of tape mounted in the dispenser, and wherein the handle extends from the base plate at an obtuse angle at a front side adjacent the nose member relative to the plane.

11. The tape dispenser of claim 1 wherein the rotatable tape mount comprises a core support assembly having a shaft secured to the frame; an axle assembly disposed about at least a portion of the shaft, the axle assembly including a hub having an outer surface, at least three arcuate arms extending outwardly from said hub outer surface, each arcuate arm overlapping another arcuate arm, an outer periphery of said arms forming a theoretical or actual cylinder configured to receive the tape core.

12. The tape dispenser of claim 11 wherein the arms include a peripheral surface having a plurality of ribs at least generally perpendicular to a longitudinal axis of each arm.

13. The tape dispenser of claim 11 wherein the arms include a chamfered or rounded edge.

14. A tape dispenser comprising a handle, a base plate disposed at an end of said handle, a rotatable tape mount engaged on said base plate, a nose member disposed on said base plate, a cylinder rotatably engaged on said nose member near a cutter which is fixed on said nose member and a guide element slidingly engaged on said base plate, said guide element being adjustable between a loading position which is slid toward the base plate to provide a space between a tape engaging end of the guide element and the nose member and a loaded position where the end of the guide element is located adjacent the nose member, wherein said rotatable tape mount comprises a stationary axle, a spring inclusive bushing mounted to said axle, and a rotatable tape mount, said rotatable tape mount including a housing that receives the bushing such that the spring engages a surface of the housing to control rotation of the tape mount and wherein the surface of the housing includes a plurality of teeth receiving the spring and wherein the teeth include a shallow sloped wall and a steeper sloped wall.

15. The tape dispenser of claim 14 wherein the bushing includes at least two springs.

16. The tape dispenser of claim 14 wherein the teeth include recesses and peaks and wherein the circumferential surface area defined by the teeth includes more surface area covered by recesses than by peaks.

17. The tape dispenser of claim 14 wherein the spring can be flexed inwardly and outwardly from a periphery of the bushing.

18. The tape dispenser of claim 1 wherein the end of the tape extends below each of the nose member and the base plate when hanging freely.

* * * * *